(12) United States Patent
Reisner

(10) Patent No.: US 10,674,195 B2
(45) Date of Patent: Jun. 2, 2020

(54) METHOD AND SYSTEM FOR DETECTING COMMERCIAL BREAKS

(71) Applicant: Disney Enterprises, Inc., Burbank, CA (US)

(72) Inventor: Samuel Joseph Reisner, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 662 days.

(21) Appl. No.: 14/177,891

(22) Filed: Feb. 11, 2014

(65) Prior Publication Data

US 2015/0229980 A1 Aug. 13, 2015

(51) Int. Cl.
*H04N 21/262* (2011.01)
*H04N 21/266* (2011.01)
*H04N 21/234* (2011.01)
*H04N 21/233* (2011.01)

(52) U.S. Cl.
CPC ..... *H04N 21/26233* (2013.01); *H04N 21/233* (2013.01); *H04N 21/23418* (2013.01); *H04N 21/266* (2013.01)

(58) Field of Classification Search
CPC ......... H04N 21/26233; H04N 21/2187; H04N 21/23418; H04N 21/26283; H04N 21/2665
USPC ........................................................ 725/32
See application file for complete search history.

(56) References Cited

U.S. PATENT DOCUMENTS

| 6,144,375 | A  | * | 11/2000 | Jain ................... G06F 17/30017 345/420 |
| 6,993,245 | B1 | * | 1/2006 | Harville ................... H04N 5/76 348/E7.061 |
| 8,151,293 | B1 | * | 4/2012 | Kolde ............... H04N 21/4263 725/32 |
| 2003/0123841 | A1 | * | 7/2003 | Jeannin .................... H04N 5/76 386/249 |
| 2004/0010807 | A1 | * | 1/2004 | Urdang ................. G06F 3/0482 725/136 |
| 2008/0062318 | A1 | * | 3/2008 | Ellis .................... H04N 5/44543 348/564 |
| 2008/0243583 | A1 | * | 10/2008 | Miyaki .................. G06Q 30/02 705/14.68 |
| 2009/0080857 | A1 | * | 3/2009 | St. John-Larkin ... H04N 5/7755 386/296 |
| 2009/0141168 | A1 | * | 6/2009 | Chen ........................ H04N 5/50 348/465 |
| 2011/0201328 | A1 | * | 8/2011 | Bowen .................. H04W 36/14 455/426.1 |

(Continued)

OTHER PUBLICATIONS

Erik "A Short Guide to Tuning Comskip", http://www.kaashoek. com/files/tuning.html , Jul. 29, 2013, 12 pages.

*Primary Examiner* — Brian T Pendleton
*Assistant Examiner* — Alan H Luong
(74) *Attorney, Agent, or Firm* — Fay Kaplun & Marcin, LLP

(57) ABSTRACT

A system and method for identifying a break in a broadcast including receiving a broadcast of an event, the broadcast comprising one of audio and video, receiving event data about the event, determining, during the event, a break threshold based on the event data and a type of the event and identifying a break based on the broadcast of the event and the break threshold.

23 Claims, 2 Drawing Sheets

(56) References Cited

U.S. PATENT DOCUMENTS

| | | | |
|---|---|---|---|
| 2012/0192227 A1* | 7/2012 | Fleischman | H04N 21/2407 725/34 |
| 2012/0219271 A1* | 8/2012 | Vunic | G06K 9/00711 386/278 |
| 2013/0205315 A1* | 8/2013 | Sinha | G06T 1/0021 725/14 |
| 2014/0068662 A1* | 3/2014 | Kumar | H04N 21/23424 725/34 |

* cited by examiner

METHOD AND SYSTEM FOR DETECTING COMMERCIAL BREAKS

BACKGROUND

Providers of broadcasts of live events, such as sporting events, insert commercial messages at breaks in the events in order to generate revenue from their broadcasts. Typically, this is accomplished manually. A producer of a live event (e.g., in a remote production facility at the site of a sporting event) communicates directly with a system operator (e.g., a broadcaster's headquarters); the producer informs the operator that a break is forthcoming, and at the appropriate time (e.g., at the end of a countdown provided by the producer), the system operator manually triggers the insertion of a commercial. This approach does not scale well where the same provider broadcasts a large number of events, due to the need for personnel to staff each event. Therefore, providers may wish to be able to detect the onset of a break automatically, without human intervention, in order to be able to broadcast larger numbers of events without the need for equally larger numbers of personnel.

Some digital video recorder ("DVR") devices include logic operative to detect the onset of a commercial break. The goal of a DVR device in including this ability is to enable a user of the device to automatically skip commercials once they have been detected. A DVR having this ability may monitor a video broadcast to detect when a commercial has been inserted by a broadcaster (e.g., by detecting a number of consecutive black frames or an absence of a network logo, also known as a "bug"), and inserting a marker into the broadcast to skip commercials, either automatically or based on a user input. Alternately, an audio-based approach may detect the onset of a commercial break by detecting an audio fade that typically separates a program from a commercial, or speech-to-text analysis may detect phrases like "we'll be back" or "welcome back."

However, these techniques may not be available or appropriate for a provider of broadcasts of live events. A video feed received at the provider's central facility will typically maintain a view of the event space (e.g., for a sporting event, a wide view of the playing field), so no detection of black frames is possible; the feed received from a remote site at a central facility will not yet include a bug, so no detection of the absence of the bug is possible. While the manual insertion of such cues (e.g., the insertion of black frames by the remote site at an appropriate break) may be possible, it may also lead to the insertion of commercials at inappropriate times if the event video periodically includes black frames that may be mistaken for a cue to initiate a commercial break by detection logic. In addition to the possibility of inaccurate triggering of commercials, there may be operational or technical limitations on the provider that prevent insertion of such cues.

DETAILED DESCRIPTION

Figure 1:
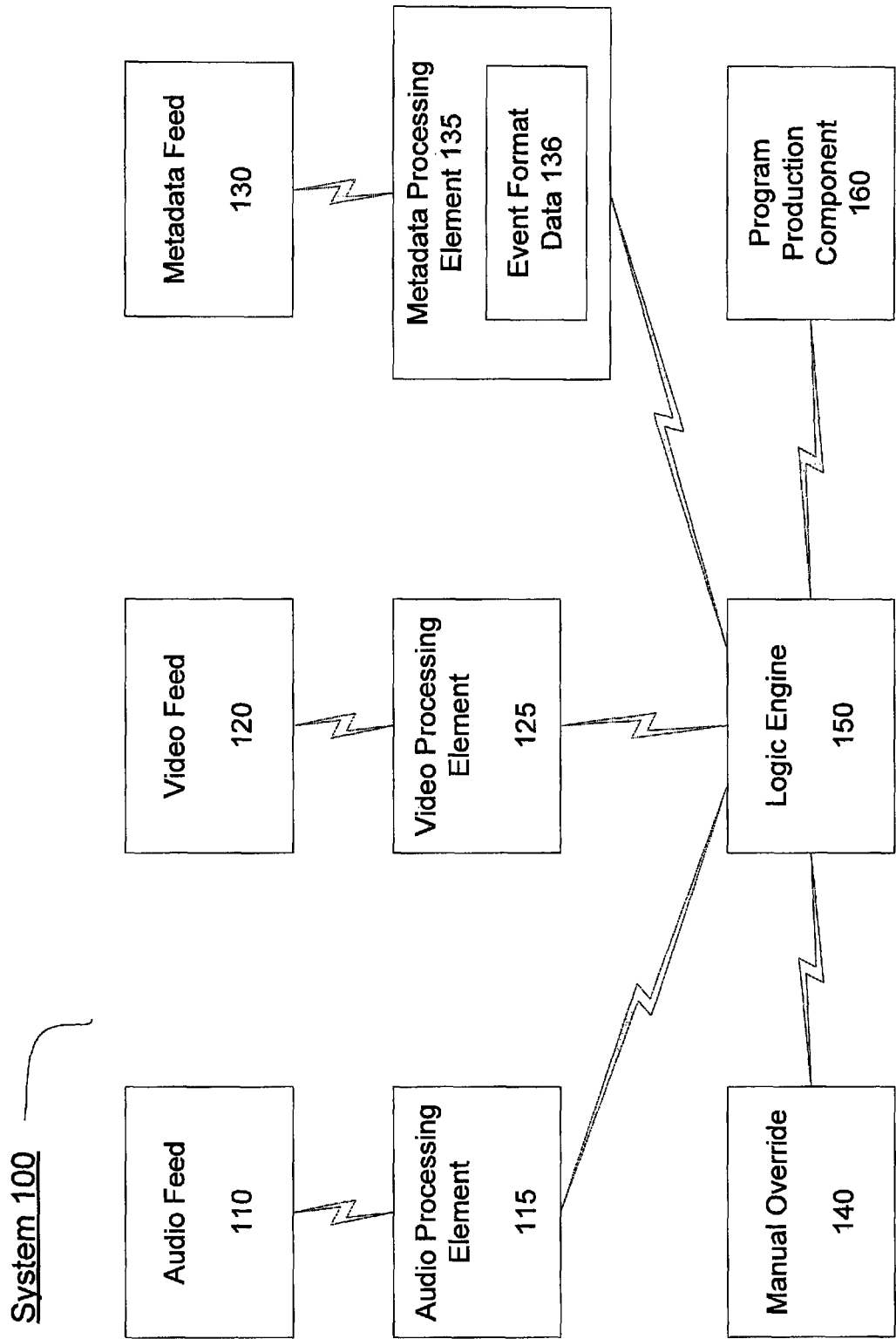
FIG. 1 shows a schematic view of a system for detecting commercial breaks according to an exemplary embodiment.

The exemplary embodiments may be further understood with reference to the following description and the related appended drawings, wherein like elements are provided with the same reference numerals. Specifically, the exemplary embodiments relate to methods and systems for detecting commercial breaks in a television broadcast.

Many events, especially sporting events, have corresponding metadata or other event data that may be used to generated expanded content for broadcasts, either on broadcast television or over the Internet. For a sporting event, this may include game score, time remaining, team statistics, individual player statistics, game situation, etc., and these metadata may be used to generate broadcast overlays, online live statistics, interactive online content, etc. For a competitive reality program, this may include information about contestant scores or other contestant progress. For a news program, this may include up-to-date election results or automatically updated breaking news. The exemplary embodiments, which will be described in detail hereinafter, use such event metadata in conjunction with observable characteristics of an audiovisual broadcast (e.g., video or audio data) to provide for automated detection of commercial breaks in a manner that is effective for implementation by broadcasters of live events.

FIG. 1 schematically illustrates an exemplary system 100 for performing automated detection of commercial breaks in an audiovisual program. Those of skill in the art will understand that the elements of the system 100 described herein may comprise a combination of computer hardware (e.g., non-transitory memory, microprocessor, etc.), software, and physical components relating to audiovisual broadcasts (e.g., cameras, video transmission equipment, etc.). The system 100 includes an audio feed 110, which may be a transmission of audio from a live event as described above. The audio feed 110 may be analog or digital, may be recorded from a single source (e.g., a microphone) or from multiple sources, and may be statically recorded or dynamically produced (e.g., by a director of the live event switching between multiple microphones). The audio feed 110 may comprise ambient audio (e.g., crowd noise, noise from a playing field) as well as commentary. The audio feed 110 may be carried from the site of the live event to a broadcaster's site by any means known in the art to be appropriate for carrying an audio feed.

The system 100 also includes a video feed 120, which may be a transmission of video from a live event as described above. The video feed 120 may be analog or digital, and may be recorded from a single source (e.g., a camera) or multiple sources. Where multiple sources are present, the video feed 120 may include the video recorded by all of the sources or may be selectively switched among the sources (e.g., by a director of the live event switching between different cameras). The video feed 120 may be carried from the site of the live event to a broadcaster's site by any means known in the art to be appropriate for carrying a video feed. Additionally, the audio feed 110 and video feed 120 may be received separately or may be received as a single audiovisual feed that may be used for both audio analysis and visual analysis as will be described hereinafter.

The system 100 also includes a metadata feed 130, which may be a transmission of metadata from a live event as described above. The metadata feed 130 may comprise any type of metadata appropriate for the type of event being broadcast. The metadata feed 130 may be transmitted together with the audio feed 110 and video feed 120 described above, or may be a separate transmission. The metadata feed 130 may be transmitted over a proprietary network (e.g., a broadcaster's internal data network) or over a public network (e.g., the Internet.)

The system 100 also includes an audio processing element 115. The audio processing element 115 may include a combination of hardware and software, and may analyze the audio received from the audio feed 110 to determine whether the contents of the audio feed 110 indicate that a break in the broadcast is occurring and a commercial should be inserted. The specific logic of the audio processing element 115 may vary among embodiments. In one exemplary embodiment, the audio processing element 115 may perform a silence detection function detecting a period of silence on the audio feed 110 that may indicate a break. In another exemplary embodiment, the audio processing element 115 may perform a speech-to-text function and may detect the existence of text indicating that a break is beginning (e.g., "we'll be right back", etc.) or ending (e.g., "welcome back," etc.). In another exemplary embodiment, the audio processing element 115 may perform both of the above functions. In another exemplary embodiment, the audio processing element 115 may perform a different function not specifically listed herein, but detecting an audio-related indication of a break in keeping with the broader principles of the exemplary embodiments.

The system 100 also includes a video processing element 125. The video processing element 125 may comprise a combination of hardware and software, and may analyze the video received from the video feed 120 to determine whether the contents of the video feed 120 indicate that a break in the broadcast is occurring and that a commercial should be inserted. The specific logic of the video processing element 125 may vary among embodiments. In one exemplary embodiment, the video processing element 125 may perform a black detection function and may detect the presence of black frames that generally separate content from breaks. In another exemplary embodiment, the video processing element 125 may perform a bug detection function and may detect the presence or absence of a bug in the video feed 110, as the absence of a bug may indicate the onset of a break.

In another exemplary embodiment, the video processing element 125 may perform a graphic detection function and may detect the presence within the video feed 110 of graphics that may typically be used before a break begins (e.g., in a sporting event, a large score banner over a wide shot; in a reality, news or other program, a large program logo). Alternately, a graphic detection function may detect the presence within the video feed 110 of graphics that may indicate that program content is being broadcast (e.g., in a sporting event or other type of competition, a small score banner or time display). In another exemplary embodiment, the video processing element 125 may perform all of the above functions. In another exemplary embodiment, the video processing element 125 may perform a different function not specifically listed herein, but detecting a video-related indication of a break in keeping with the broader principles of the exemplary embodiments.

The system 100 also includes a metadata processing element 135. The metadata processing element 135 may comprise a combination of hardware and software, and may analyze data received from the metadata feed 130 to determine whether the event metadata may indicate that the broadcast is more likely or less likely to be at a break. The metadata processing element 135 may include a memory storing event format data 136 about the type of the event being broadcast. The event format data 136 may be generalized information about the type of event to which the data received from the metadata feed 130 may be compared in order to make determinations based on the data received from the metadata feed 130. More specifically, the event format data 136 may reflect the likelihood of a commercial break occurring based on various situations within the event, and the specific situational information pertaining to the current state of the event received by the metadata feed 130 may be compared to the event format data 136 to determine a likelihood that the event is currently in a break or about to go to a break.

Thus, it will be apparent to those of skill in the art that the specific contents of the event format data 136 will vary based on the nature of the event. It will be further apparent that the same metadata processing element 135 may process metadata for various types of events at various points in time; therefore, different types of event format data 136 may be present at the metadata processing element 135, with only the relevant event format data 136 being active at a given time. In exemplary embodiments involving sporting events, clock status and score information may be received, for example, directly from scoreboard data or may be determined based on tracking a status display shown in the video broadcast (e.g., through the use of character recognition software).

In one exemplary embodiment, the event being broadcast may be a baseball game. In such an embodiment, the event format data 136 may indicate that there is a low likelihood of a commercial break occurring when the metadata (e.g., nonzero count of balls and strikes) indicates that an at-bat is presently taking place. The event format data 136 may further indicate that there is a medium likelihood of a commercial break occurring when the metadata (e.g., zero balls and strikes) indicates that no at-bat is presently taking place. The event format data 136 may further indicate that there is a high likelihood of a commercial break occurring when the metadata indicates that a half-inning has ended (e.g., there are three outs), or that a pitching change is occurring.

In another exemplary embodiment, the event broadcast may be a football game. In such an embodiment, the event format data 136 may indicate that there is a low likelihood of a commercial break occurring when the metadata indicates that a team is currently in the middle of an offensive series. The event format data 136 may further indicate that there is a medium likelihood of a commercial break occurring when the metadata indicates that possession of the ball has changed. The event format data 136 may further indicate that there is a high likelihood of a commercial break occurring at the end of a quarter or at the two-minute warning.

In another exemplary embodiment, the event broadcast may be a basketball game. In such an embodiment, the event format data 136 may indicate that there is a low likelihood of a commercial break occurring when the ball is in play (e.g., the game clock is moving). The event format data 136 may further indicate that there is a medium likelihood of a commercial break occurring when the ball is not in play (e.g., the game clock is stopped). The event format data 136 may further indicate that there is a high likelihood of a commercial break occurring when a timeout has recently been called or at the end of a quarter.

In another exemplary embodiment, the event broadcast may be an ice hockey game. In such an embodiment, the event format data 136 may indicate that there is a low likelihood of a commercial break occurring when the puck is in play (e.g., the game clock is moving). The event format data 136 may further indicate that there is a medium likelihood of a commercial break occurring when the puck is not in play (e.g., the game clock is stopped). The event format data 136 may further indicate that there is a high likelihood of a commercial break occurring when a timeout has recently been called, at designated television time-out points in the game clock, or at the end of a period.

In another exemplary embodiment, the event broadcast may be a soccer game. In such an embodiment, the event format data 136 may indicate that there is a low likelihood of a commercial break during a half (e.g., the game clock is running). The event format data 136 may further indicate that there is a high likelihood of a commercial break occurring during pre-match, half-time, or after a match has ended (e.g., the game clock is not running).

In another exemplary embodiment, the event broadcast may be a competitive reality television program. In such an embodiment, the event format data 136 may indicate that there is a low likelihood of a commercial break occurring when an event or contestant's turn is ongoing (e.g., while there is live scoring taking place or while an event clock is running). The event format data 136 may further indicate that there is a medium likelihood of a commercial break occurring between events or contestants' turns (e.g., while there is no live scoring taking place or event clock running). The event format data 136 may further indicate that there is a high likelihood of a commercial break occurring when between segments (e.g., when live scoring data indicates that each contestant has taken the same number of turns).

In another exemplary embodiment, the event broadcast may be a live news program. In such an embodiment, the event format data 136 may indicate that there is a low likelihood of a commercial break occurring while a live in-bound news feed is on-air (e.g., a feed from the White House press room is currently routed to the program). The event format data 136 may further indicate that there is a medium likelihood of a commercial break occurring when end-of-show music is triggered.

In the above-described exemplary embodiments, specific reference has been made to "low", "medium" and "high" likelihood of commercial breaks occurring. However, it will be apparent to those of skill in the art that the quantity and designations of levels mentioned above are only exemplary, and that other embodiments may have more or fewer levels of likelihood. In one alternative example, the event format data 136 may include a class of situations for which there may be no likelihood that a commercial break is occurring. It will be further apparent to those of skill in the art that the types of events and corresponding types of event format data 136 listed above are only exemplary, and that there may be an endless variety of other types of events not specifically listed herein, each of which may have its own corresponding event format data 136. It will be further apparent to those of skill in the art that, for each of the types of events and corresponding types of event format data 136 listed above, the specifically listed contents of the event format data 136 are only exemplary and that, for each of these specific types of event, the event format data 136 may vary among differing embodiments.

The system 100 also includes a manual override 140. The manual override 140 may be a trigger operated by a user who is viewing the event being broadcast to manually indicate that a break has been initiated. The manual override 140 may be implemented by any means known in the art and may be operated by a user situated at a remote broadcast site (e.g., a remote production truck) or a central production site.

Output from the audio processing element 115, the video processing element 125, the metadata processing element 135 and the manual override 140 is received by a logic engine 150. The logic engine 150 may use the output of the metadata processing element 135 to dynamically (e.g., during the course of a broadcast) adjust thresholds applied to the output of the audio processing element 115 and the video processing element 125 to detect the onset of a commercial break. For example, the logic engine 150 may dynamically set, during the course of a broadcast, a threshold number of black frames required to trigger the onset of a commercial break based on the likelihood of a commercial break received from the metadata processing element 135 at any given time, and may examine the video for sequences of black frames exceeding the dynamically adjusted threshold. In addition, or as an alternative, a similar dynamically adjusted threshold may be set during the course of a broadcast for a network bug (e.g., a number of frames without the bug that may trigger a commercial break) or for a period of silence in the broadcast (e.g., an amount of silent time in the broadcast that may trigger a commercial break).

In an alternative exemplary embodiment, the logic engine 150 may also operate in a probabilistic manner. In such an embodiment, each input from the audio processing element 115, the video processing element 125 and the metadata processing element 135 may be considered to contribute to an overall likelihood of a commercial break occurring. For example, if the metadata processing element 135 determines that there is a low likelihood of a commercial break, this may contribute 5% to the overall likelihood, while a medium likelihood may contribute 15% to the overall likelihood and a high likelihood may contribute 35% to the overall likelihood. Similarly, a contribution to the overall likelihood may be assigned based on a number of consecutive black frames, a number of consecutive frames without a network bug, an amount of time of silent video. All the contributions may be summed to yield an overall likelihood, and the logic engine 150 may determine the occurrence of a commercial break if the overall likelihood meets an overall threshold. It will be apparent to those of skill in the art that the specific percentages described above are only exemplary. The logic engine 150 may also interpret input received from the manual override. This input may automatically trigger a break; in the probabilistic terms used above, this may indicate a 100% chance that the program is currently in break.

Once the logic engine 150 has determined the occurrence of a commercial break, it may indicate this determination to the program production component 160. This step may be analogous to an operator manually triggering a break based on monitoring the progress of the program, and may initiate the broadcast of commercials according to known techniques. It will be apparent to those of skill in the art that the program production component 160 refers to program production systems in a generalized manner and is not intended to limit the disclosure to any particular type of physical component.

Figure 2:
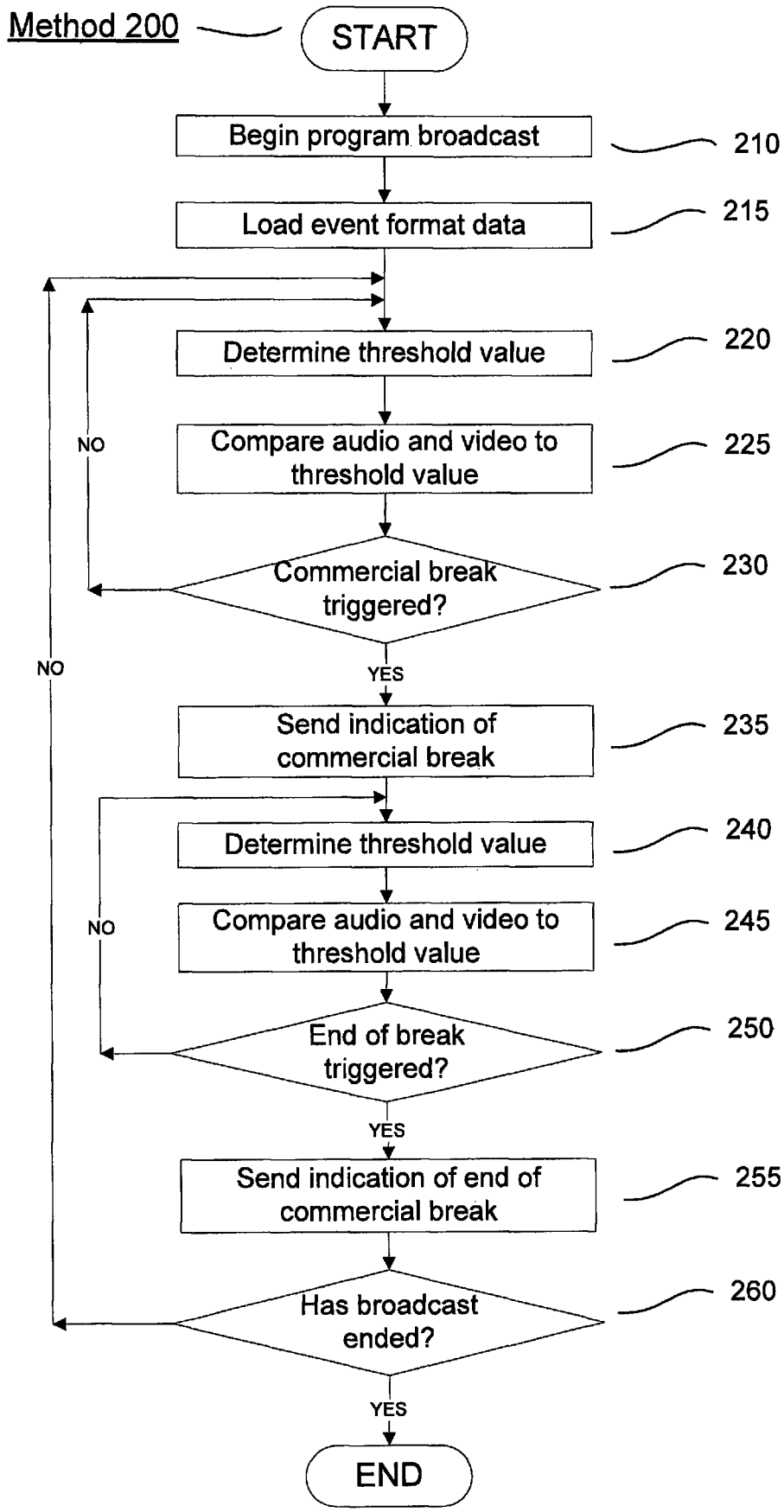
FIG. 2 shows an exemplary method for detecting commercial breaks according to an exemplary embodiment.

FIG. 2 illustrates an exemplary method 200 for performing automatic detection of commercial breaks. The method 200 will be described with specific reference to the system 100 of FIG. 1, but those of skill in the art that the method 200 may be performed by different configurations of components (e.g., combinations of hardware and software) without departing from the broader spirit of the exemplary embodiments.

In step 210, a broadcast of an event commences. The event may be a live event, such as a sporting event, as described above. The broadcast may include audio data over the audio feed 110, video data received over the video feed 120, and metadata received over the metadata feed 130. In step 215, the metadata processing element 135 may load event format data 136 appropriate to the event. This may be accomplished by a user manually selecting the appropriate type of event format data 136 for the event or may be an automated task, such as by making a determination based on the metadata that is being received over the metadata feed 130.

In step 220, the logic engine 150 determines a threshold value to trigger a commercial break based on the data received from the metadata feed 130 and the event format data 136. As described above, the logic engine 150 may compare the data about the current status of the event to the general information about the type of event as embodied in the event format data 136 to determine a likelihood that the event will have a commercial break based on the current status of the event. This threshold may be, for example, a number of frames of black video, one of the other types of thresholds discussed above, or a different type of audio-based or video-based triggering threshold not specifically described herein. In an alternative embodiment, a predetermined threshold value may be set before or during the game, either automatically (e.g., using a machine learning algorithm) or by a human operator, and a value determined based on event metadata, event video and event audio (e.g., a weighted average) may be compared to the threshold value to identify the onset of a commercial.

In step 225, the logic engine 150 compares the audio data received via the audio feed 110 and processed by the audio processing element 115, and the video data received via the video feed 120 and processed by the video processing element 125, to the threshold determined in step 220. In another embodiment, rather than determining a threshold based on the metadata in step 220 and comparing the audio and video data to the threshold in step 225, the logic engine 150 may determine an overall probability that the event is in a break, and compare the overall probability to a probability threshold. As described above, this overall probability may be determined by summing probability factors based on the interpretation of the audio feed 110 by the audio processing element 115, the video feed 120 by the video processing element 125, and the metadata feed 130 by the metadata processing element 135. In another exemplary embodiment, different weightings may be applied to different probability factors to yield a weighted sum, or the weighting factors may be combined in another manner; it will be apparent to those of skill in the art that any number of other ways to combine the probability factors may be applied without departing from the broader principles outlined by the exemplary embodiments.

In step 230, the logic engine 150 determines whether a commercial break has been triggered based on the determinations of steps 220 and 225 (e.g., if an aspect of the video or audio has exceeded a threshold, or if a sum of factors due to video, audio and metadata exceeds a combined threshold). If no commercial break has been triggered, then the method returns to step 220 and the determination of the threshold is updated as described above. It will be apparent to those of skill in the art that steps 220-230 may be continuously repeated during the duration of a broadcast.

If, in step 230, it was determined that a commercial break has been triggered, then in step 235, the logic engine 150 sends a message to the program production component 160 to indicate that a commercial should be played. The specific nature of this step may vary depending on the specific nature of the program production component 160, as the specific details of the program production component 160 may vary among differing embodiments, as noted above. In one embodiment, the logic engine 150 may send a message that a commercial break is likely to occur soon, drawing the attention of a human operator who is managing multiple event to the particular event.

In step 240, a new threshold value is determined relating to evaluating a return from the commercial break that was triggered in step 235. As was the case in step 220, the logic engine 150 determines the threshold value based on the data received from the metadata feed 130 and the event format data 136, which may involve comparing the data about the current status of the event to the general information about the type of event as embodied in the event format data 136 to determine a likelihood that the commercial break will end at a given time. In one embodiment, this threshold may be an inverse to the threshold described above, such as a number of frames of non-black video, a resumption of audio broadcasting, a re-insertion of the network bug, etc.

In step 245, the logic engine 150 compares the audio data received via the audio feed 110 and processed by the audio processing element 115, and the video data received via the video feed 120 and processed by the video processing element 125, to the threshold value determined in step 240, in substantially the same manner as described above with reference to step 225.

In step 250, the logic engine 150 determines whether a return from commercial break has been triggered based on the determinations of steps 240 and 245 (e.g., if an aspect of the video or audio has exceeded a threshold, or if a sum of factors due to video, audio and metadata exceeds a combined threshold). If no return from commercial break has been triggered, then the method returns to step 245 and the determination of the threshold is updated as described above. It will be apparent to those of skill in the art that steps 245-255 may be continuously repeated during the duration of a commercial break.

If, in step 250, it was determined that a return from commercial break has been triggered, then in step 255, the logic engine 150 sends a message to the program production component 160 to indicate that the broadcast should return to the live event. As was the case above for step 235, the specific nature of this step may vary depending on the specific nature of the program production component 160, as the specific details of the program production component 160 may vary among differing embodiments, as noted above. Alternately, this may be triggered by a user via the manual override 140, or through the use of a timer timing the duration of the commercial break.

In step 260, the logic engine 150 determines whether the broadcast has ended. If the broadcast is continuing, then the method returns to step 220 and the threshold is updated based on the current metadata for the broadcast received via the metadata feed 130. If the broadcast has ended, then the method 200 terminates after step 260.

The exemplary embodiments described above enable monitoring of a live event to determine when the event is entering a break in order to automatically trigger a resulting action or to alert a user to trigger the action. Because the exemplary embodiments use multiple inputs, including audio, video, and data, they may provide for a more accurate determination than prior art approaches using only one input. Further, the use of metadata in conjunction with audio and video input may render a determination that is suitable for use by the broadcaster of an event to determine when to trigger the insertion of commercials, whereas prior techniques, created with viewers in mind, are not suitable for use by broadcasters. Additionally, because the exemplary embodiments require minimal user interaction in order to detect a break, they are scalable to monitor a significant quantity of broadcasts simultaneously without requiring significant numbers of users.

Those of skill in the art will understand that the above-described exemplary embodiments may be implemented in any number of matters, including as a software module, as a combination of hardware and software, etc. For example, the exemplary method 200 may be embodied in a program stored in a non-transitory storage medium and containing lines of code that, when compiled, may be executed by a processor.

It will be apparent to those skilled in the art that various modifications may be made to the exemplary embodiments, without departing from the spirit or the scope of the invention. Thus, it is intended that the present invention cover modifications and variations of this invention provided they come within the scope of the appended claims and their equivalents.

What is claimed is:

1. A method, comprising:
   receiving at least one of a video feed and an audio feed that is to be included in a broadcast of an event;
   receiving event data about the event;
   receiving event format data corresponding to a type of the event, wherein the event format data includes a break likelihood value for each of a plurality of situations that correspond to the type of the event;
   determining a break threshold based on the event data and the event format data; and
   identifying an onset of a break based on comparing at least one of the video feed, the audio feed or the event data to the break threshold for use in inserting a commercial into the broadcast of the event prior to the broadcast being provided to a viewer.

2. The method of claim 1, wherein the event data is metadata.

3. The method of claim 1, wherein the break threshold comprises one of a number of consecutive black frames in the video feed, a number of consecutive frames without a logo in the video feed, a predetermined audio cue in the audio feed or an amount of silent time in the audio feed.

4. The method of claim 1, wherein the step of determining the break threshold is performed continuously during the event.

5. The method of claim 1, further comprising:
   receiving a manual override from a user; and
   identifying the break based on the manual override.

6. The method of claim 1, further comprising:
   inserting a commercial into the broadcast after the onset of the break has been identified.

7. The method of claim 1, further comprising:
   identifying an end of the break.

8. The method of claim 7, wherein the end of the break is determined based on a timer and an expected duration of the break.

9. The method of claim 7, wherein the end of the break is determined based on a break return threshold.

10. The method of claim 9, wherein the break return threshold comprises one of a number of consecutive non-black frames in the video feed, a number of consecutive frames with a logo in the video feed, or an amount of non-silent time in the audio feed.

11. A system, comprising:
    an audiovisual feed receiving an audio feed of an event and a video feed of the event that is to be included in a broadcast of the event;
    a data feed receiving event data about the event;
    a memory storing event format data corresponding to a type of the event, wherein the event format data includes a break likelihood value for each of a plurality of situations that correspond to the type of the event; and
    a processor configured to perform operations comprising:
       determining a break threshold based on the event data and the event format data, and
       identifying an onset of a break based on comparing at least one of the video feed, the audio feed or the event data to the break threshold for use in inserting a commercial into the broadcast of the event prior to the broadcast being provided to a viewer.

12. The system of claim 11, wherein the event data is metadata.

13. The system of claim 11, wherein the break threshold is one of a number of consecutive black frames in the video feed, a number of consecutive frames without a logo in the video feed, a predetermined audio cue in the audio feed or an amount of silent time in the audio feed.

14. The system of claim 11, wherein the processor determines the break threshold continuously during the event.

15. The system of claim 11, wherein the processor further receives a manual override from a user and identifies the break based on the manual override.

16. The system of claim 11, wherein the processor further inserts a commercial into a broadcast of the event when the break has been identified.

17. The system of claim 11, further comprising, wherein the processor further identifies an end of the break.

18. The system of claim 17, wherein the end of the break is determined based on a timer and an expected duration of the break stored in the event format data.

19. The system of claim 17, wherein the processor identifies the end of the break based on a break return threshold.

20. The system of claim 19, wherein the break return threshold comprises one of a number of consecutive non-black frames in the video feed, a number of consecutive frames with a logo in the video feed, or an amount of non-silent time in the audio feed.

21. A non-transitory computer-readable storage medium storing a set of instructions executable by a processor, the set of instructions, when executed by the processor, causing the processor to perform operations comprising:
    receiving a video feed and an audio feed that is to be included in a broadcast of an event;
    receiving event data about the event;
    receiving event format data corresponding to a type of the event, wherein the event format data includes a break likelihood value for each of a plurality of situations that correspond to the type of the event;
    determining a break threshold based on the event data and the event format data; and
    identifying an onset of a break based on comparing at least one of the video feed, the audio feed or the event data to the break threshold for use in inserting a commercial into the broadcast of the event prior to the broadcast being provided to a viewer.

22. The non-transitory computer-readable storage medium of claim 21, wherein the operations further comprise:
    inserting a commercial into the broadcast after the onset of the break has been identified.

23. A method, comprising:
    receiving a video feed and an audio feed that is to be included in a broadcast of an event;
    receiving event data about the event;

receiving event format data corresponding to a type of the event, wherein the event format data includes a break likelihood value for each of a plurality of situations that correspond to the type of the event;

determining a break likelihood value, wherein a first portion of the break likelihood value is based on at least one of the video feed or the audio feed and a second portion of the break likelihood value is based on a comparison between the event data and the event format data;

comparing the break likelihood value to a predetermined break threshold; and identifying an onset of a break based on the comparing the break likelihood value to the predetermined threshold for use in inserting a commercial into the broadcast of the event prior to the broadcast being provided to a viewer.

* * * * *